United States Patent
Chen et al.

(10) Patent No.: US 11,605,126 B1
(45) Date of Patent: Mar. 14, 2023

(54) DETECTING FRAUD IN CREDIT APPLICATIONS

(71) Applicant: Wells Fargo Bank, N.A., San Francisco, CA (US)

(72) Inventors: Jie Chen, Charlotte, NC (US); Carmel Nadav, Eagan, MN (US); Manish Pandey, Bengaluru (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/456,743

(22) Filed: Nov. 29, 2021

(51) Int. Cl.
*G06Q 40/02* (2012.01)

(52) U.S. Cl.
CPC .................................. *G06Q 40/025* (2013.01)

(58) Field of Classification Search
None
See application file for complete search history.

(56) References Cited

U.S. PATENT DOCUMENTS

| | | |
|---|---|---|
| 7,427,016 B2 | 9/2008 | Chimento |
| 8,458,082 B2 | 6/2013 | Halper et al. |
| 8,567,669 B2 | 10/2013 | Griegel et al. |
| 8,606,712 B2 | 12/2013 | Choudhuri et al. |
| 10,013,655 B1 | 7/2018 | Clark |
| 10,453,142 B2 | 10/2019 | Mun |
| 10,762,561 B2 | 9/2020 | Straub et al. |
| 11,049,109 B1 | 6/2021 | Kramme et al. |
| 2008/0005001 A1 | 1/2008 | Davis et al. |
| 2008/0040275 A1 | 2/2008 | Paulsen et al. |
| 2012/0130853 A1 | 5/2012 | Petri et al. |
| 2013/0018777 A1* | 1/2013 | Klein ..................... G06Q 40/02 705/38 |
| 2015/0339769 A1 | 11/2015 | Deoliveira et al. |
| 2018/0293660 A1* | 10/2018 | Rakshe .............. G06Q 10/0635 |
| 2021/0182877 A1* | 6/2021 | Horesh .................. G06N 20/00 |

OTHER PUBLICATIONS

Gershen-Siegel, Get the Secrets of Which SIC Codes Get You Denied, 2017, retrieved from https://www.creditsuite.com/blog/which-sic-codes-get-you-denied/ (Year: 2017).*

(Continued)

*Primary Examiner* — Gregory S Cunningham, II
(74) *Attorney, Agent, or Firm* — Merchant & Gould P.C.

(57) ABSTRACT

The concept involves efficiently using machine learning to quickly identify possible fraudulent applications in small business loan and credit applications by automatically flagging applications that meet certain criteria. In one preferred implementation, the tool compares a business description to a selected NAICS code in a loan application to assess the potential for fraud. Specifically, an algorithm can match the leftmost two digits of the selected code with the description of the category from an applicant. An engine calculates a probability of a fraud score based on the matching attached to the application. Because the tool detects fraud proactively rather than reactively, it substantially reduces computational costs and resources and reduces the biases associated with highly intensive manual work.

20 Claims, 11 Drawing Sheets

(56) References Cited

OTHER PUBLICATIONS

Loten, "Banks Use Software Bots to Process Surge of Pandemic-Related Loans", https://www.wsj.com/articles/banks-use-software-bots-to-process-surge-of-pandemic-related-loans-11591735728, Jun. 9, 2020, 4 pages.

Automation Anywhere, "Automation Anywhere Launches AI-Powered Banking Botto Expedite SBA Loan Processing From 3 Weeks to 3 Days", https://www.prnewswire.com/news-releases/automation-anywhere-launches-ai-powered-banking-bot-to-expedite-sba-loan-processing-from-3-weeks-to-3-days-301041759.html, Apr. 16, 2020, 8 pages.

Viaene et al., "Auto claim fraud detection using Bayesian learning neural networks" https://www.sciencedirect.com/science/article/abs/pii/S0957417405000825, Oct. 2005, Expert Systems with Applications, vol. 29, No. 3, pp. 653-666.

\* cited by examiner

Figure 9

DETECTING FRAUD IN CREDIT APPLICATIONS

BACKGROUND

Financial institutions process thousands of requests for loans each year. Information associated with the applicant is gathered as part of the loan application process. This information is used to determine whether the applicant qualifies for the requested loan. It can be a significant challenge to process this information and mitigate risks of fraud associated with these loan processes.

SUMMARY

Embodiments of the disclosure are directed to detecting potential fraud in loan applications.

According to aspects of the present disclosure, a system comprises: one or more processors; and non-transitory computer-readable storage media encoding instructions which, when executed by the one or more processors, causes the computer system to: receive a business description of a business applying for a loan from an applicant; generate classification options for the business by querying a database using the business description; compare a selection of one of the classification options by the applicant to the classification options; determine if a fraud threshold is met based upon the compare; and when the fraud threshold is met, identify the loan as problematic.

In another aspect, a computer-implemented method capable of processing loan applications comprising: receiving a description of a business applying for a loan from an applicant; generating classification options for the business by querying a database using the description; comparing a selection of one of the classification options by the applicant to generated options; determining if a fraud threshold is met based upon the comparing; and when the fraud threshold is met, flagging the loan as problematic.

In yet another aspect, a computer system capable of in Payroll Protection Program loans submitted to a financial institution, comprising: one or more processors; and non-transitory computer-readable storage media encoding instructions which, when executed by the one or more processors, causes the computer system to: receive text input from a customer associated with an application for a Payroll Protection Program loan, wherein the text input is a description of a business; generate classification options for the text input by querying a database using the description of the business, wherein the classification options are presented to the customer on a graphical user interface; compare a selection of one of the classification options by the customer to generated options, wherein the customer manually elects a classification options which is not one of the generated options; and based on a rating score, flag the application for review by the financial institution.

The details of one or more techniques are set forth in the accompanying drawings and the description below. Other features, objects, and advantages of these techniques will be apparent from the description, drawings, and claims.

DESCRIPTION OF THE DRAWINGS

FIG. 9 shows another aspect of the graphical user interface of FIG. 4.

DETAILED DESCRIPTION

Figure 1:
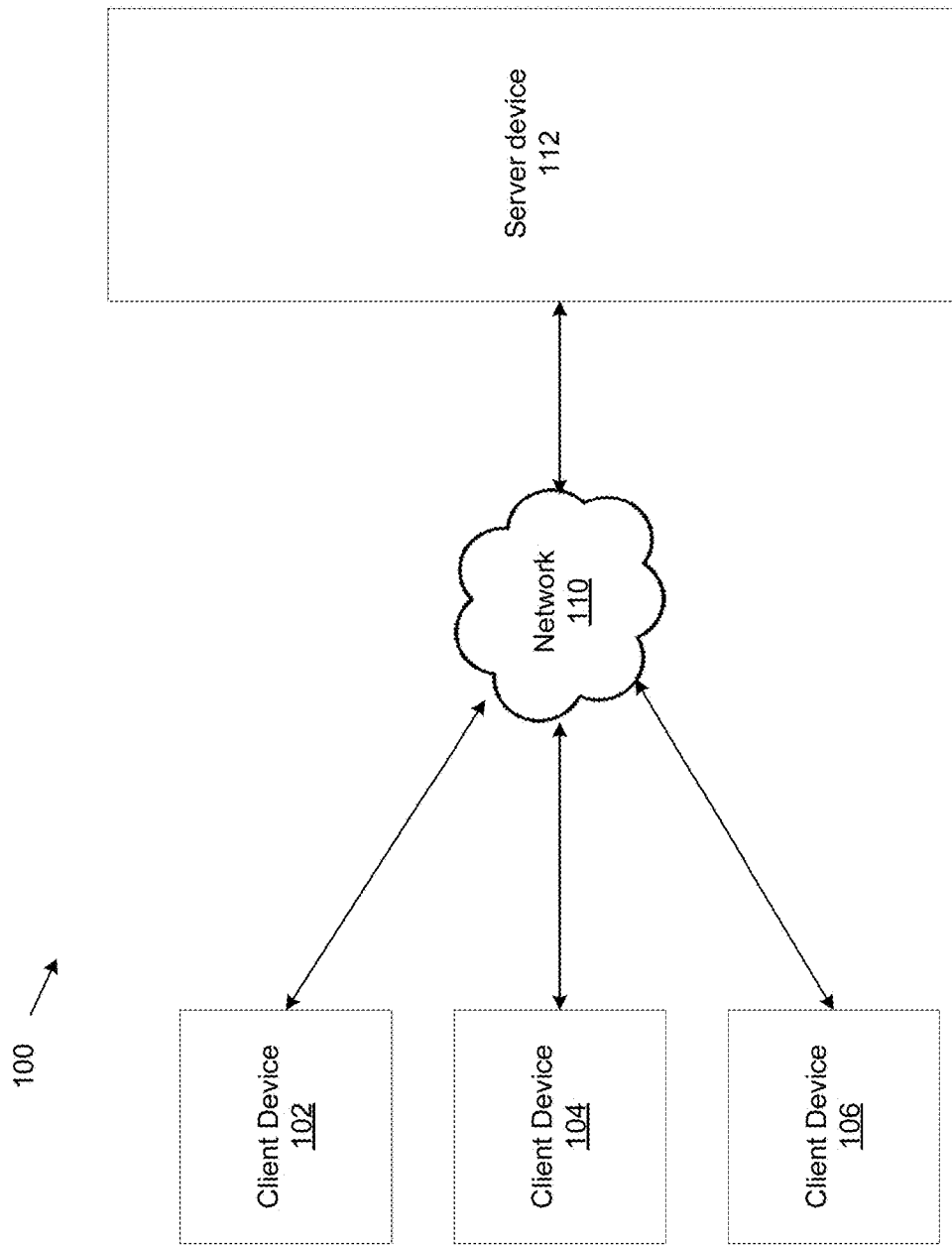
FIG. 1 shows an example system for processing credit applications.

This disclosure relates to detecting fraud in business applications to any credit product.

Financial institutions process millions of requests for credit products each year. Examples of such credit products include loans and credit cards. Each request typically involves information that the applicant provides. This information is used by the financial institution to determine whether the applicant qualifies for the requested credit product. A certain percentage of applications involve fraudulent information, and these applications are identified as early in the application process as possible to mitigate the impact of this activity.

The concepts described herein can provide an early warning to detect fraud proactively rather than reactively and can include substantially reducing computational costs and resources and reducing biases associated with highly intensive manual work. The concept can include a machine learning classification tool. In some examples, the tool takes a business description provided by the applicant and returns a suggested code from which the applicant may choose. A machine learning model is trained using the data that has been trained to recognize certain patterns, providing an algorithm that can be used to reason over and learn from the data. In the examples provided, the tool implements a machine learning approach to industry classification, which promises efficiency, scalability, and adaptability.

One possible implementation is detecting fraud in a Payroll Protection Program (PPP) loan, which is a Small Business Association-backed loan that helps businesses keep their workforce employed during the COVID-19 crisis provided by the US Federal Government. An applicant applying for a PPP loan must provide a description of the business and select the appropriate NAICS code. Given a business description from the applicant, the NAICS engine provides five potential NAICS codes from which the customer can choose.

The preeminent taxonomy for industry classification is the NAICS, which is the standard used by, among other organizations, the United States Census Bureau. The 2017 NAICS taxonomy arrays the North American business economy into 1057 industries, each corresponding to a six-digit code. Each industry belongs to an industry group, represented by the first four digits of the code, which in turn belongs to a subsector, represented by the first three digits, which in turn belongs to a sector, represented by the first two digits. In addition to the 1057 industries, NAICS comprises 20 sectors, 99 subsectors, and 311 industry groups.

This concept is a novel approach to industry classification, utilizing a multilayer perceptron. Because the classifier relies on machine learning rather than manual labor, the approach provides a highly efficient solution for classifying companies that are not already contained within an extant database. Moreover, by thresholding the predictions of the classifier based on confidence scores, corporations are able to be classified into six-digit NAICS industries with greater precision than that of the classifications provided by premier databases. Finally, the framework of the model can be used to label companies according to any industry classification schema, not only NAICS. As a result, the algorithm can rapidly adapt to changing industries in a way that classification systems tied to the static NAICS taxonomy cannot.

Leveraging information (e.g., through an Application Programming Interface (API) provided by ZoomInfo Technologies LLC of Vancouver, Wash. (formerly EverString Technology) to construct a database of companies labeled with the industries to which they belong, deep neural networks are trained to predict the industries of novel companies. The model's capacity is examined to predict six-digit NAICS codes and the ability of the model architecture to adapt to other industry segmentation schemas. Additionally, the ability of the model was investigated to generalize despite the presence of noise in the labels in the training set. Finally, increasing predictive precision by thresholding based on the confidence scores that the model outputs along with its predictions is implemented.

Presently, in one implementation, PPP loan applications that show if an application is flagged as suspicious, the majority of the time, the selected NAICS code is incorrect and possibly associated with an attempt to mislead the system. For example, "hair, nails or beauty salons" fall under NAICS code 81, which is "other services". Applications have been observed that described as "hair, nails or beauty salons" listing NAICS code 72, which stands for "accommodation and food services". All industries not qualified under code 72 are entitled to a loan up to 2.5 percent of the average monthly payroll. Industry 72 is entitled up to 3.5 percent of the average monthly payroll, thereby being more attractive for fraudsters.

More specifically, the concept involves the automated flagging of PPP loan applications that meet certain criteria. Specifically, an algorithm can match the leftmost two digits of the selected NAICS code with the description of the industry from the customer. An engine calculates a probability of fraud based on the matching attached to the loan application.

FIG. 1 schematically shows aspects of an example system 100 of the present disclosure. The system 100 includes client devices 102, 104, 106, and a server device 112.

The client devices 102, 104, 106 may be one or more computing devices that can include a mobile computer, desktop computer, or other computing device used by a customer to generate or receive data.

In one non-limiting example, a client device 102 is used by an applicant to submit application data regarding a loan application with the server device 112, such as business information.

The client devices 102, 104, 106 can communicate with the server device 112 through the network 110 to transfer data. The server device 112 can also obtain data via other input devices, which can correspond to any electronic data acquisition processes (e.g., from third parties through an application programming interface—API).

The server device 112 can be managed by, or otherwise associated with, an enterprise (e.g., a financial institution such as a bank, brokerage firm, mortgage company, or any other money-handling enterprise) that uses the system 100 for data management and/or deep learning processes. The server device 112 receives data from one or more of the client devices 102, 104, 106.

Figure 2:
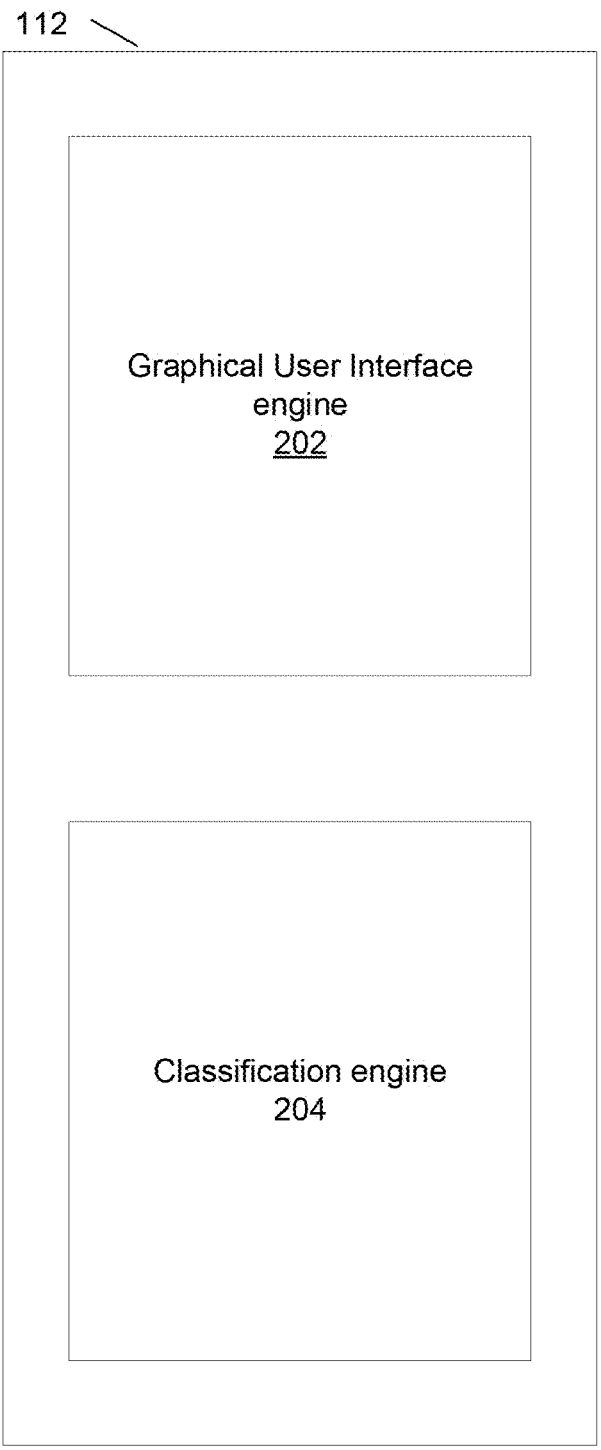
FIG. 2 shows example logical components of a server device of the system of FIG. 1.

FIG. 2 schematically shows aspects of a server device 112 of the system 100. The server device 112 includes a graphical user interface engine 202 and a classification engine 204.

The graphical user interface module 202, rendered on the client devices 102, 104, 106, provides an interface for displaying and navigating the results of the classification engine 204. In some examples, the graphical user interface module 202 can render interfaces that allow an applicant to access a survey, submit data to the classification engine 204, store results associated with classifications generated, and otherwise manipulate the classification results, as described further below. See, e.g., FIGS. 4-9.

The classification engine 204 is programmed to manage the transport and storage of classification codes based upon the business description text provided by the applicant associated with the description, such as a business description, etc. Additional details of the classification engine 204 are provided below.

Figure 3:
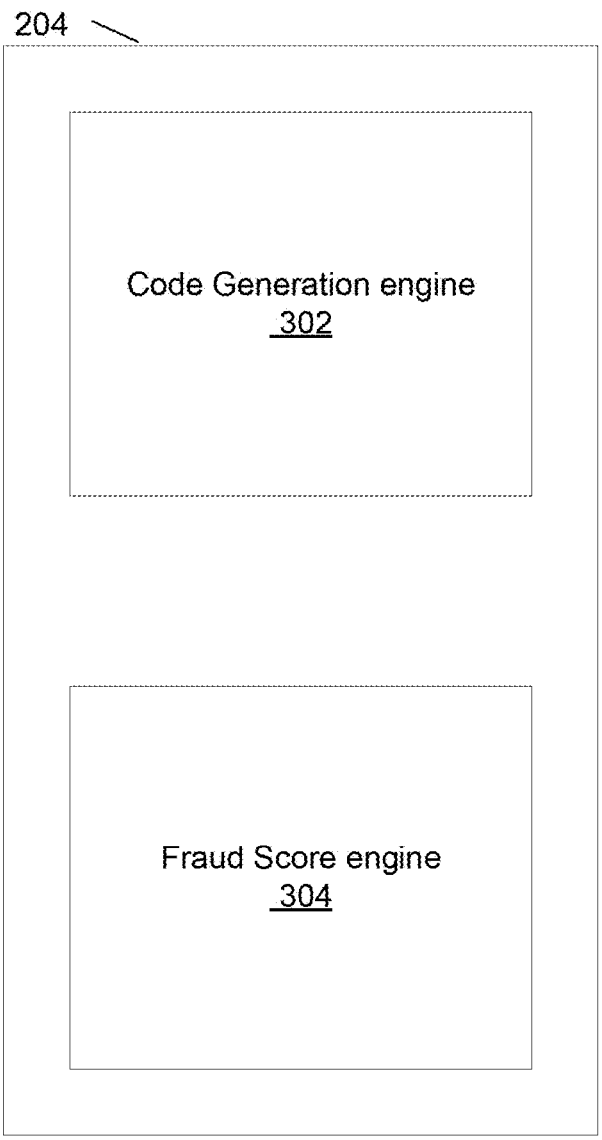
FIG. 3 shows example logical components of a classification module of the server device of FIG. 2.

FIG. 3 schematically shows aspects of the classification engine 204 of the server device 112. The classification engine 204 includes a code generation engine 302, and a fraud score engine 304.

The code generation engine 302 establishes pre-selected codes based on the input provided from the applicant in the business description text field box. Training sets are constructed from a database, such as EverString's proprietary database, an index of over 18 million companies tying each entity to a detailed set of attributes. The massive size of the database is compiled by combining data purchased from private vendors with data extracted from the Internet by our internally developed web-crawling technologies, which calls for storage on a distributed file system, such as HDFS (Hadoop Distributed File System).

The model utilizes a standard multilayer perceptron architecture. Specifically, a neural network with four fully-connected layers is used. After each of the first three layers a perform batch normalization, tanh activation, and dropout with a keep probability of 0.5 are performed. The first fully-connected layer has a hidden dimension of 640; the second and third layers have a hidden dimension of 4096. The output dimension of the final layer is the number of industries into which are being classified. In one preferred implementation, where classification is occurring according to six-digit NAICS codes, the output dimension of this layer is 1057. The dimension of each training example that is input to the neural network, which corresponds to the number of keywords in the dense matrix loaded from the sparse feature vectors in a minibatch, is 350,000. As a result, for six-digit NAICS classification, the model uses around 250 million parameters (350000*640+640*4096+4096*4096+4096*1057).

The weighted loss function is addressed with a scheme of differential inter- and intra-class weighting. The classes are weighed according to the ratio of the total number of training examples to the number of training examples for that class. If there are C classes, N examples in the training set, and c examples in a particular class, the weight for that class is set according to the following Equation 1.

$$\sqrt{\frac{N}{C*c}} \quad \text{(Equation 1)}$$

This weighting scheme up-weights the classes with fewer examples and down-weights the classes with more examples so that the model learns robustly across all classes, rather than learning in a skewed fashion. It only predicts the most well-represented classes. Evidence that such an inter-class weighting schema also leads to a loss function robust to noisy labels in the training set. However, that is addressed to the noisy label problem using intra-class weighting. For six-digit NAICS classes with particularly noisy labels, the EverString's HIT system is used to manually verify the labels for a small number of training examples (around 200). The verified examples are then up-weighted while the unverified are down-weighted. If a particular class contains N examples, V of which are verified and U of which are verified, the weight for a verified example is shown in Equation 2.

$$\left(1 - \frac{1}{2^{V/100}}\right) * \frac{V}{N} \quad \text{(Equation 2)}$$

The weight for an unverified example is shown in Equation 3.

$$\left(\frac{1}{2^{V/100}}\right) * \frac{U}{N} \quad \text{(Equation 3)}$$

This weighting scheme allows the model to prioritize the verified examples in such a way that the model skews more heavily toward the verified examples as the number of verified examples increases, without affecting the distribution of interclass weights.

Once the code options are automatically generated and presented to the applicant, and if the applicant decides to select a code option from a drop-down list manually, the tool can detect the application is suspicious immediately upon the applicant's submission using the fraud score engine 304. By thresholding the model's predictions based on a fraud score (or a confidence score, which may be used interchangeably), the six-digit NAICS codes can precisely predict, even for difficult-to-classify industries. The fraud score can flag potential fraud in a binary manner, while the confidence score is output as a value that measures possible fraud as a score between two values.

The fraud score engine 304 can be adjusted to a preferred tolerance score in flagging potential records that may contain fraudulent data. The fraud score engine 304 is engaged when the applicant manually selects a code rather than choosing from the generated code options provided by the code generation engine 302.

FIGS. 4-9 schematically shows an interface 400 generated by the graphical user interface engine 202 of the present disclosure. The interface 400 is generated via the server device 112 for presentation on one or more of the client devices 102, 104, 106.

The interface 400 enables the user to use a secure channel to connect to the application survey that contains the classification engine 204. In one non-limiting example, the applicant can access the application survey directly from an institution's web application.

Figure 4:
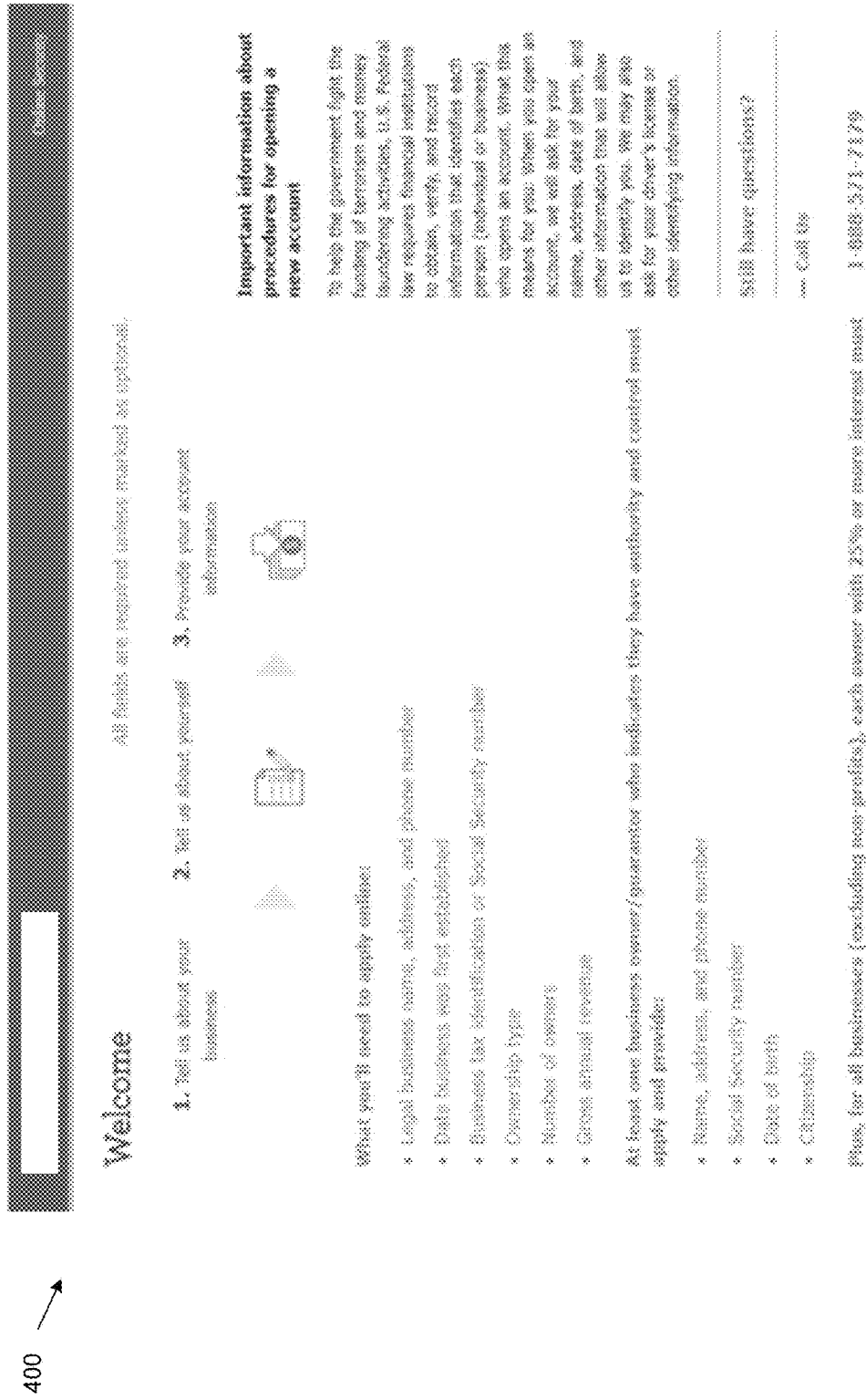
FIG. 4 shows a graphical user interface for submitting a credit application using the server device of FIG. 1.

Upon selecting the requested application type option, FIG. 4 shows the applicant the required information to proceed in the application survey process. In one non-limiting example, the type of application can be for a PPP loan or other credit product.

Figure 5:
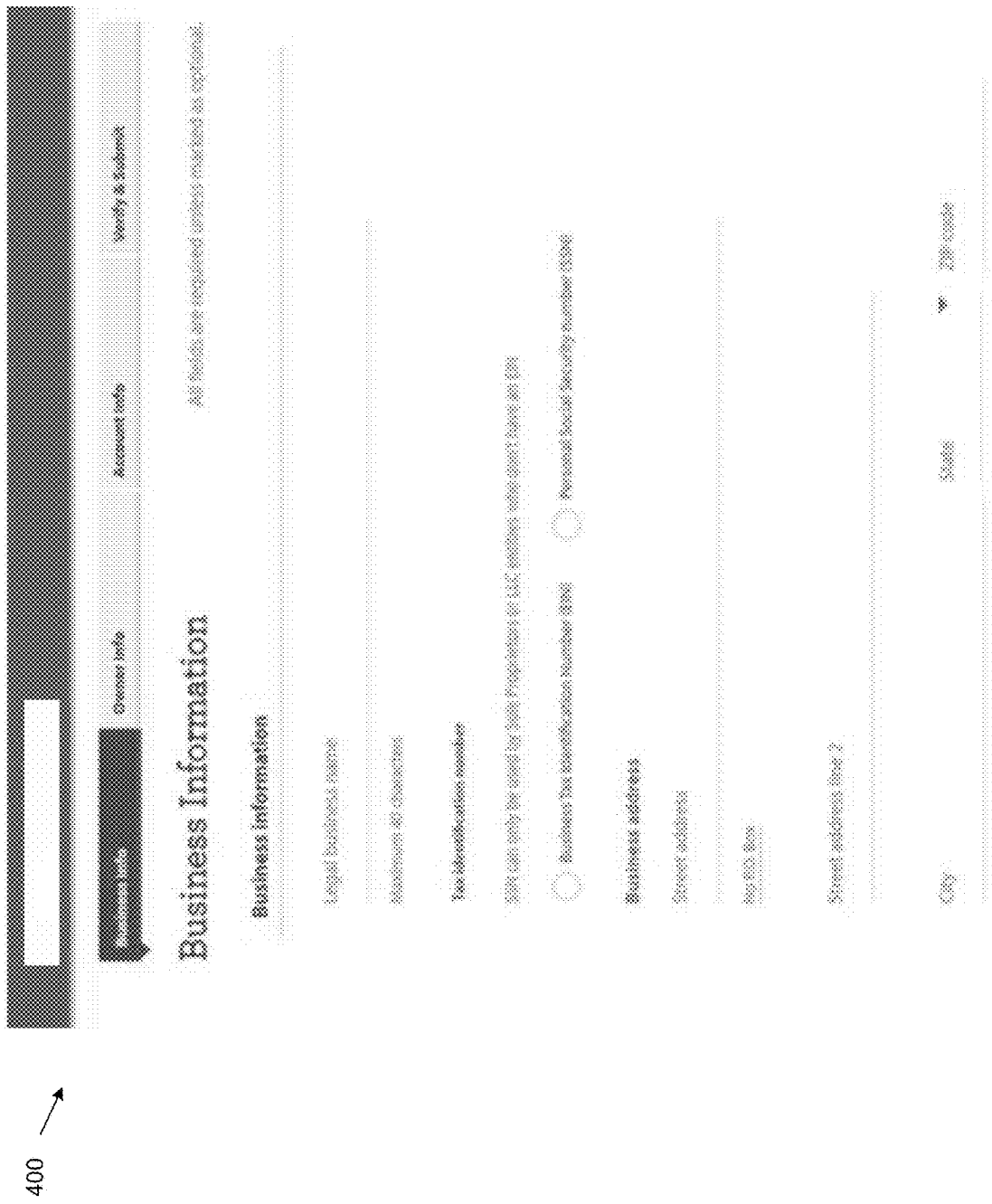
FIG. 5 shows another aspect of the graphical user interface of FIG. 4.

The interface in FIG. 5 displays the text fields required by the applicant, including business information, such as tax identification number, business address, etc. The applicant proceeds to enter the requested information to move forward in the application survey process.

Figure 6:
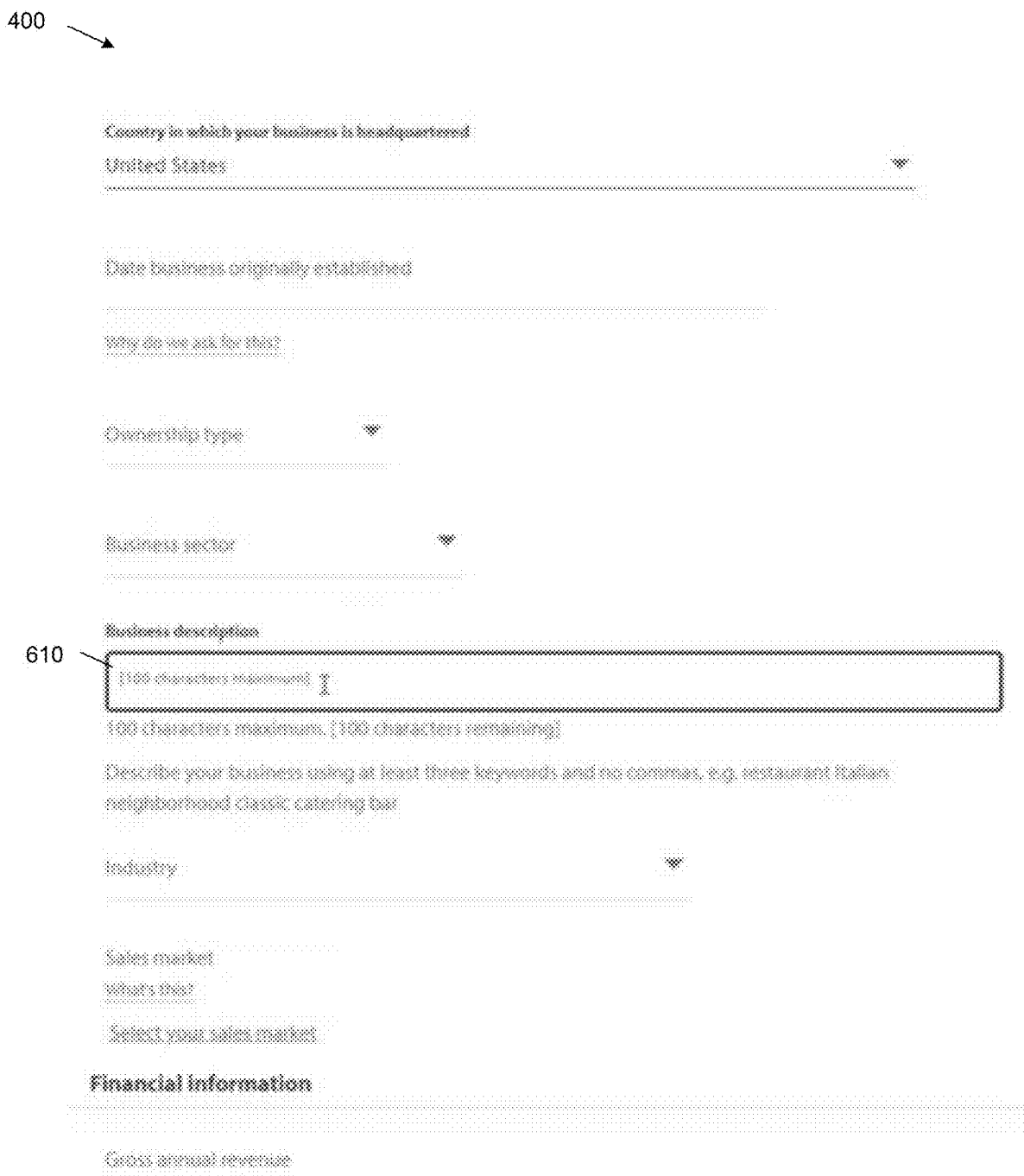
FIG. 6 shows another aspect of the graphical user interface of FIG. 4.

FIG. 6 displays a later portion of the application survey requesting a business description of a max of 100 characters. Here, the applicant manually enters a short description of the business into a text box field 610. In some examples, the description of the business entered into the box can be a maximum of 100 characters. In other examples, the description is between 100-300 characters or a maximum of 300 characters. Other configurations are possible.

Figure 7:
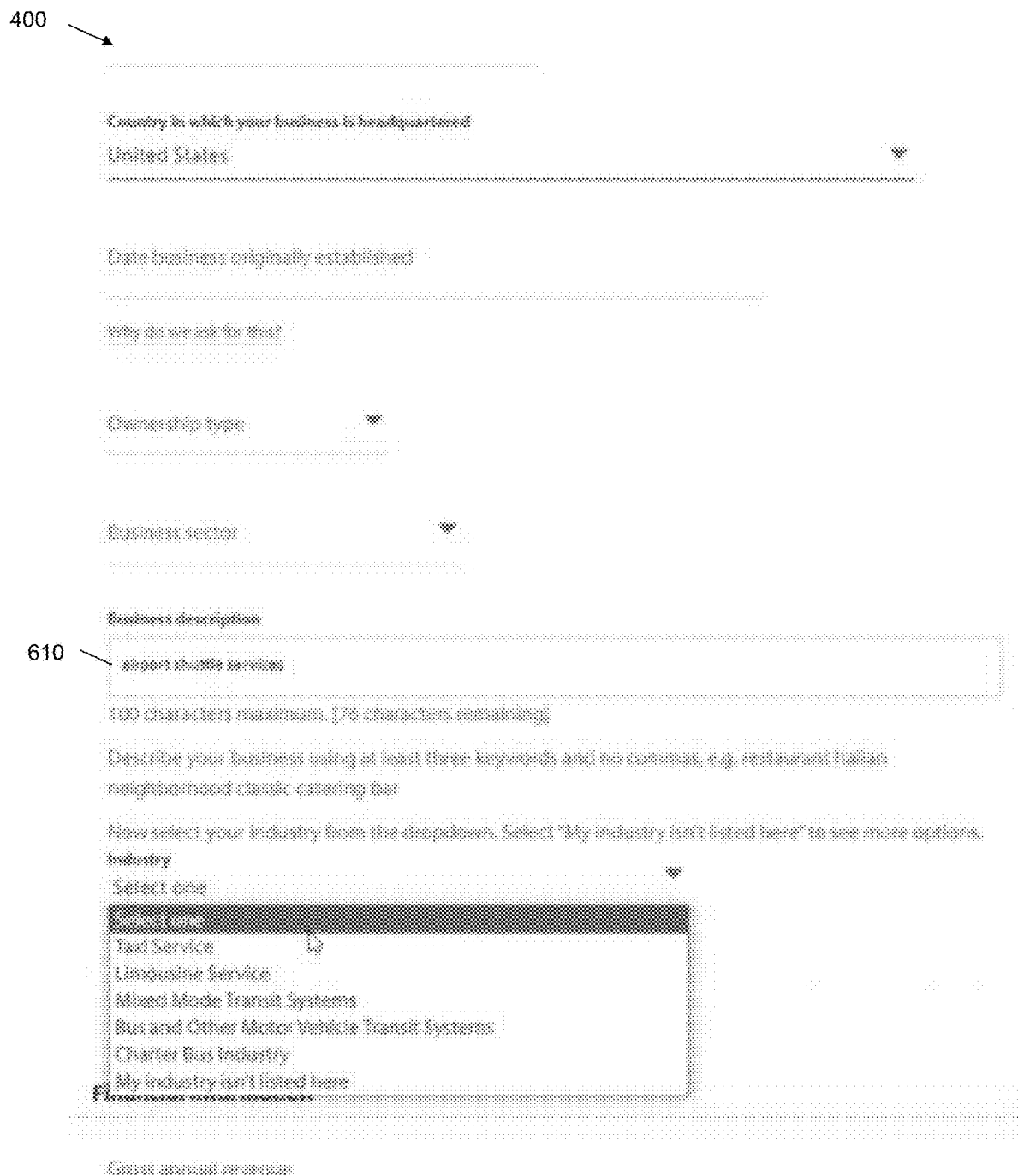
FIG. 7 shows another aspect of the graphical user interface of FIG. 4.

FIG. 7 displays that the applicant had entered "airport shuttle services" into the business description text box field 610. From the applicant's text, the interface shows that the industry drop-down menu populated options that the classification engine 204 deemed to align with the applicant's submitted business described above.

Figure 8:
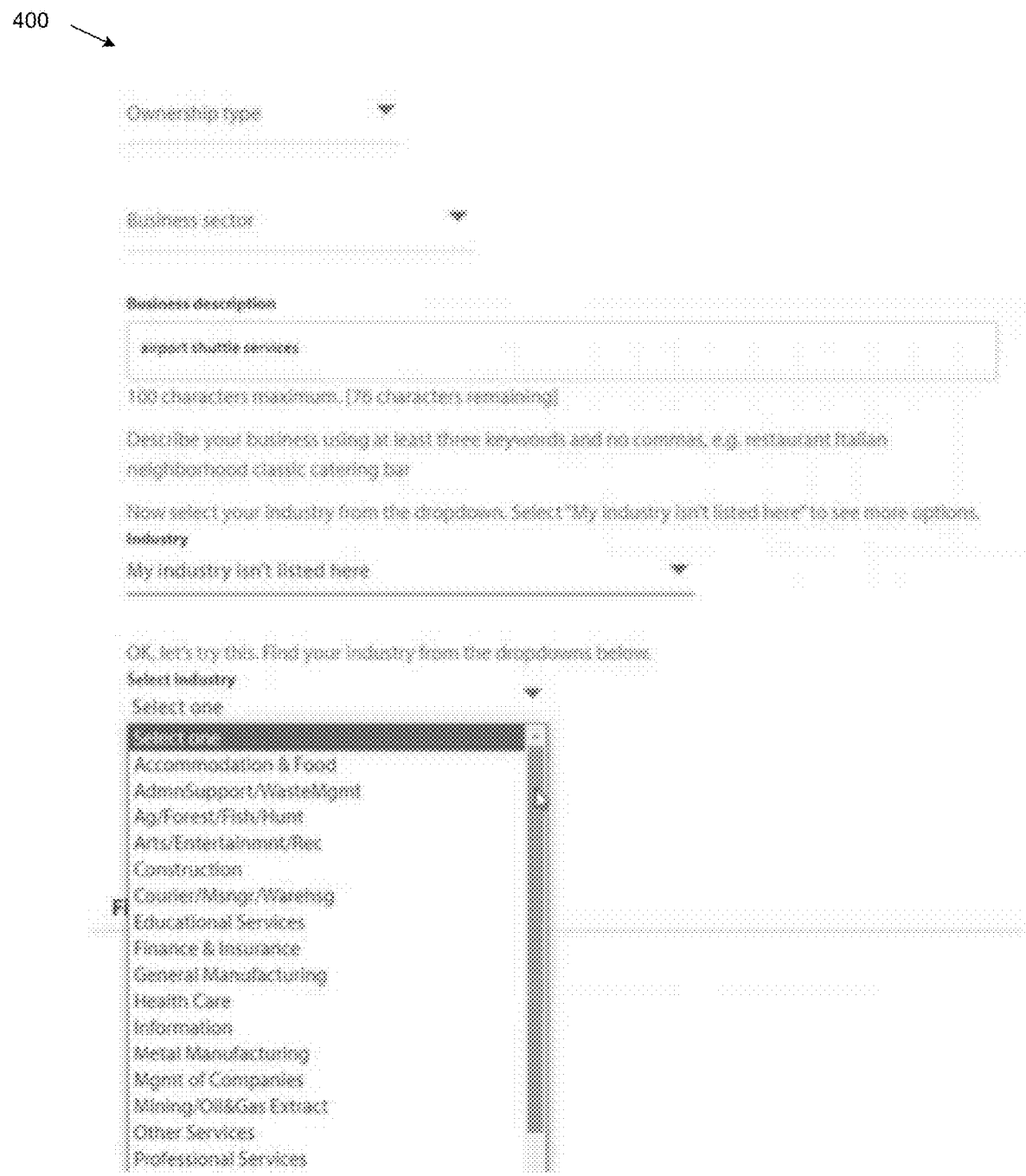
FIG. 8 shows another aspect of the graphical user interface of FIG. 4.

FIG. 8 shows that the applicant was not interested in the industry options generated by the classification engine 204, where the applicant selected "My industry is not listed here". As a result, the applicant will manually choose their intended industry from a complete drop-down list, which may or may not be as accurate as the classification engine 204 had generated based on the provided business description text input from the applicant.

Figure 9:
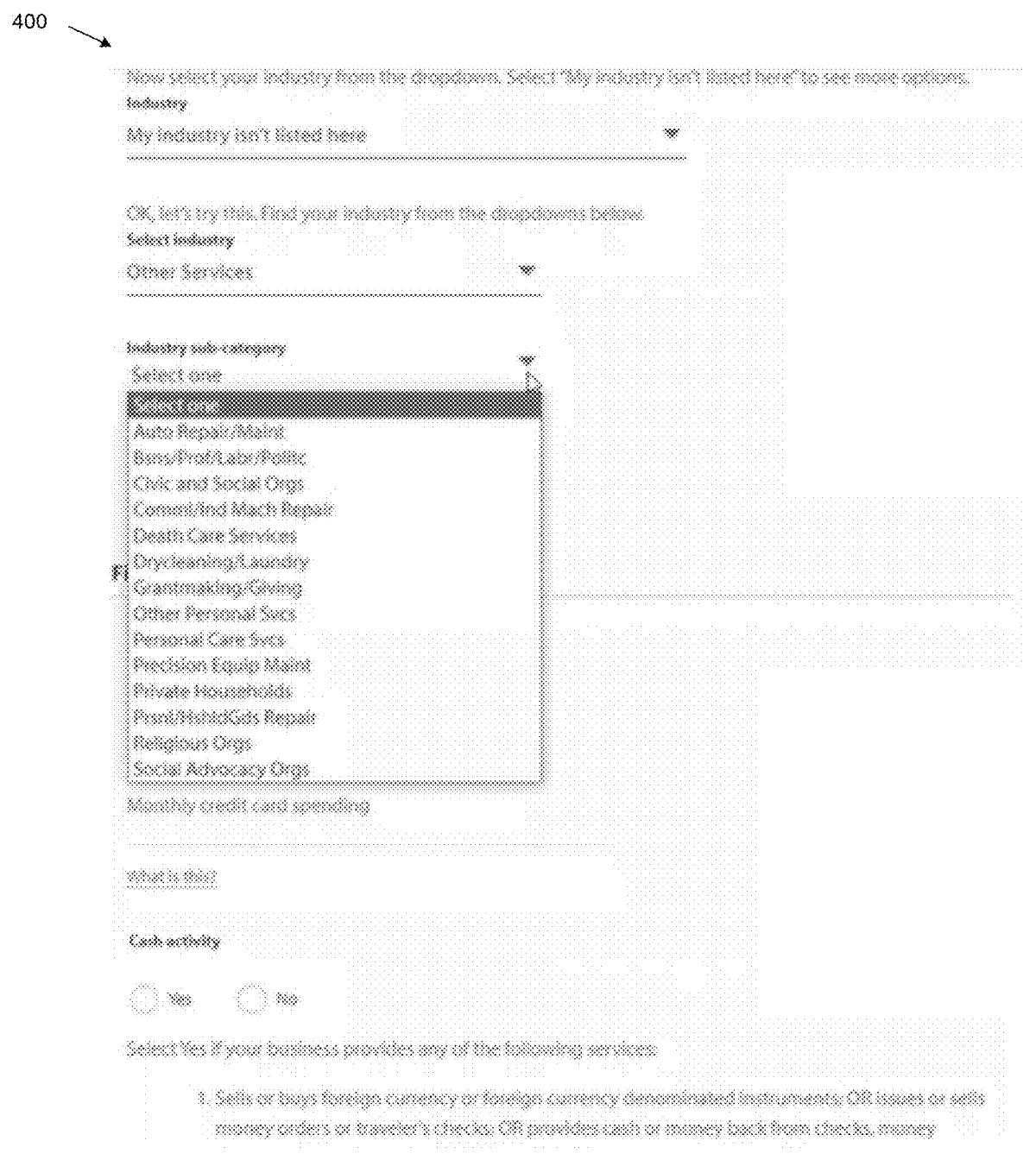

FIG. 9 shows that the applicant had selected "other services," which allowed the applicant to select an industry sub-category manually. In cases where the applicant manually selects an option rather than an option automatically generated by the classification engine, fraud is deemed more likely to occur.

In one non-limiting example, an applicant may desire a loan with a NAICS code that has a sector of 72 because a sector of 72 may provide for a bigger loan with more lenient repayment policies than other than sectors, such as 81, 61, and 32. An applicant with a business that falls under "hair salon services" would be presented with pre-selected codes not including 72 because 72 is for "food and accommodations". The applicant may attempt to defraud the system by manually selecting the sector of 72 because qualifying as such a business would result in a greater net gain for themselves.

Once the applicant attempts to enter the NAICS code starting with 72, the two left most digitals are compared to those found in any of the generated NAICS codes provided to the applicant from the drop-down list. If the two left most digitals from the manually selected option are not found in any of the automatically generated options based on the business description input, the application is immediately flagged as a problematic record, whether or not fraud has occurred. Once flagged, the institution will proceed to review the application with notice that the application may be fraudulent.

The fraud score engine 304 can be adjusted to "loosen" the tolerance of the tool to the desired threshold. For example, the fraud score engine 304 may be modified to be flag applications with even one match of sectors. If the choice is two digits in the left-most column are found in all option cases, there is no possibility of fraud or a problematic record. Another example is that if all generated options start with the same two digits and those two digits match the applicant's manual selection, then the application is deemed legitimate.

Figure 10:
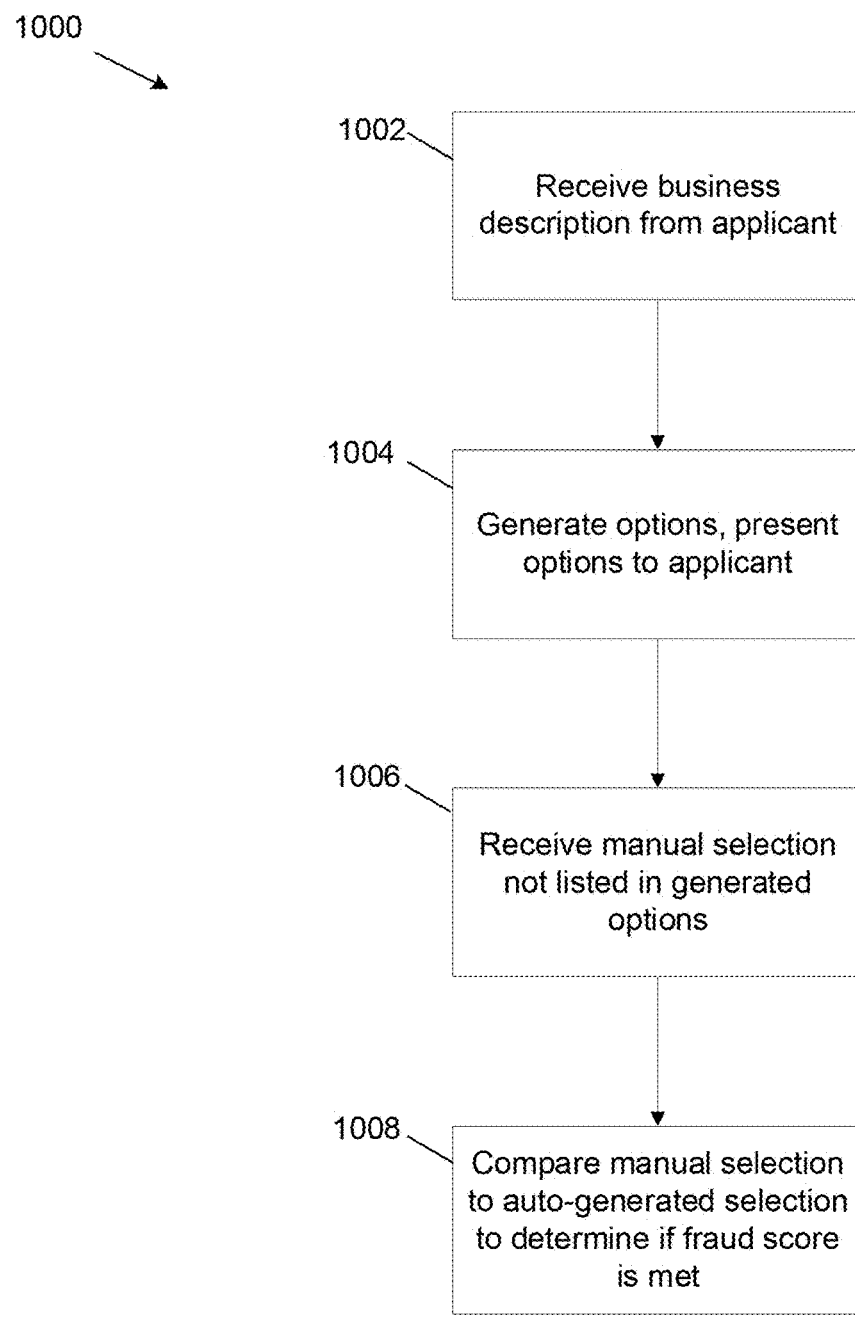
FIG. 10 shows an example method implemented by the system of FIG. 1.

FIG. 10 shows an example method 1000 for detecting fraud in applications using the classification engine of FIG. 2.

At step 1002, the business description text is received by the applicant in the application survey. This can be accomplished in various ways, such as through the graphical user interfaces described here. See FIGS. 4-9.

Next, at operation 1004, options are generated based on the business description text from the applicant in the business description text field box. The options are generated based on a machine learning model that is dynamically engaged to relearn and grow its library of data. The generated options are displayed to the applicant in the form of a drop-down list for the applicant to select an option.

Next, at operation 1006, if the applicant decides not to use the generated options, the applicant manually selects a choice from a drop-down list not featured in the generated options because it was deemed not relevant as the generated options.

Finally, at operation 1008, the tool compares the manually selected option by the applicant against the auto-generated options to determine if the fraud score has been met. If the fraud score threshold has been met, then the application is flagged as problematic.

Although the examples described above relate to loans requested through the PPP, the concepts described herein are equally applicable to other types of loans and credit products. For instance, different classification systems such as Merchant Category Classification (MCC), where the code for which is a four-digit number used by the credit card industry to classify businesses into market segments, and Standard Industrial Classification (SIC), where the code for which is another four-digit number may be applicable.

Figure 11:
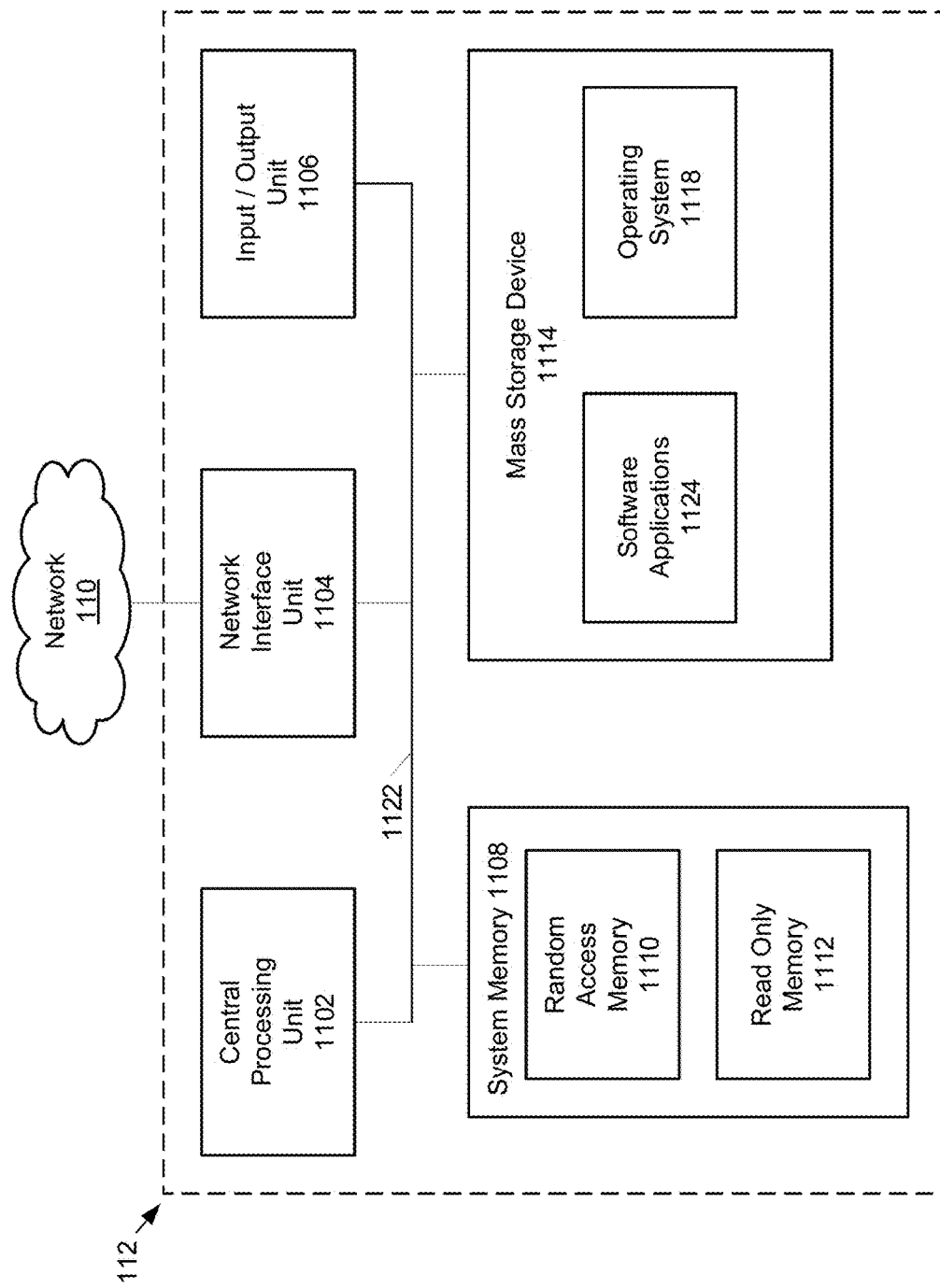
FIG. 11 shows example physical components of the server device of FIG. 2.

As illustrated in the example of FIG. 11, server device 112 includes at least one central processing unit ("CPU") 1102, a system memory 1108, and a system bus 1122 that couples the system memory 1108 to the CPU 1102. The system memory 1108 includes a random access memory ("RAM") 1110 and a read-only memory ("ROM") 1112. A basic input/output system containing the basic routines that help transfer information between elements within the server device 112, such as during startup, is stored in the ROM 1112. The server device 112 further includes a mass storage device 1114. The mass storage device 1114 can store software instructions and data. A central processing unit, system memory, and mass storage device similar to that in FIG. 11 are also included in other computing devices disclosed herein (e.g., devices 102, 104, 106).

The mass storage device 1114 is connected to the CPU 1102 through a mass storage controller (not shown) connected to the system bus 1122. The mass storage device 1114 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 1104 connected to the system bus 1122. It should be appreciated that the network interface unit 1104 may also be utilized to connect to other types of networks and remote computing systems. The server device 112 also includes an input/output controller 1106 for receiving and processing input from a number of other devices, including a touch user interface display screen or another type of input device. Similarly, the input/output controller 1106 may provide output to a touch user interface display screen or other output devices.

As mentioned briefly above, the mass storage device 1114 and the RAM 1110 of the server device 112 can store software instructions and data. The software instructions include an operating system 1118 suitable for controlling the operation of the server device 112. The mass storage device 1114 and/or the RAM 1110 also store software instructions and applications 1124, that when executed by the CPU 1102, cause the server device 112 to provide the functionality of the server device 112 discussed in this document. For example, the mass storage device 1114 and/or the RAM 1110 can store the graphical user interface engine 202, and the classification engine 204.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for processing loan applications, comprising:
   one or more processors; and
   non-transitory computer-readable storage media encoding instructions which, when executed by the one or more processors, causes the computer system to:
      create a classification model by training a neural network with a plurality of layers using a training data set;
      weight classes within the classification model to facilitate learning across the classes;
      receive a business description of a business applying for a loan from an applicant;
      generate, using the classification model, classification options for the business using the business description;
      compare a selection of one of the classification options by the applicant to the classification options;
      determine if a fraud threshold is met based upon the compare;
      when the fraud threshold is met, identify the loan as problematic; and when the fraud threshold is not met, identify the loan as nonproblematic.

2. The computer system of claim 1, wherein the loan is a Payroll Protection Program loan.

3. The computer system of claim 2, wherein the classification options are based upon North American Industry Classification System codes.

4. The computer system of claim 2, comprising further instructions which, when executed by the one or more processors, causes the computer system to use a leftmost two digits of the selection to determine the fraud threshold.

5. The computer system of claim 2, wherein the business description is less than 100 characters in length.

6. The computer system of claim 1, wherein the loan application is for a credit card product.

7. The computer system of claim 1, wherein the fraud threshold is adjustable.

8. The computer system of claim 1, wherein the classification options are based upon North American Industry Classification System codes.

9. The computer system of claim 1, comprising further instructions which, when executed by the one or more processors, causes the computer system to use a leftmost two digits of the selection to determine the fraud threshold.

10. The computer system of claim 1, wherein the business description is less than 100 characters in length.

11. A computer-implemented method capable of processing loan applications comprising:
   creating a classification model by training a neural network with a plurality of layers using a training data set;
   weighting classes within the classification model to facilitate learning across the classes;
   receiving a description of a business applying for a loan from an applicant;
   generating, using the classification model, classification options for the business using the description;
   comparing a selection of one of the classification options by the applicant to generated options;
   determining if a fraud threshold is met based upon the comparing;
   when the fraud threshold is met, flagging the loan as problematic; and
   when the fraud threshold is not met, identifying the loan as nonproblematic.

12. The method of claim 11, wherein the database is sourced from third-party sources.

13. The method of claim 11, wherein a certain percentage of applications are flagged based on the comparing.

14. The method of claim 13, further comprising modifying the comparing to accommodate detection of a high-risk industry.

15. The method of claim 11, further comprising applying the comparing to government loan programs.

16. The method of claim 11, further comprising allowing the applicant to select a sub-industry option.

17. The method of claim 11, further comprising allowing the applicant to apply online from a client device.

18. The method of claim 11, wherein the fraud threshold is set to a confidence level.

19. A computer system capable of detecting fraud in Payroll Protection Program loans submitted to a financial institution, comprising:
   one or more processors; and
   non-transitory computer-readable storage media encoding instructions which, when executed by the one or more processors, causes the computer system to:
      create a classification model by training a neural network with a plurality of layers using a training data set;
      weight classes within the classification model to facilitate learning across the classes;
      receive text input from a customer associated with an application for a Payroll Protection Program loan, wherein the text input is a description of a business;
      generate, using the classification model, classification options for the text input using the description of the business, wherein the classification options are presented to the customer on a graphical user interface;
      compare a selection of one of the classification options by the customer to generated options, wherein the customer manually elects a classification options which is not one of the generated options; and
      based on a rating score, flag the application for review by the financial institution.

20. The system of claim 19, wherein the rating score is binary.

* * * * *